US011418539B2

(12) United States Patent
Shieh

(10) Patent No.: US 11,418,539 B2
(45) Date of Patent: Aug. 16, 2022

(54) DENIAL OF SERVICE ATTACK MITIGATION THROUGH DIRECT ADDRESS CONNECTION

(71) Applicant: International Business Machines Corporation, Armonk, NY (US)

(72) Inventor: Johnny Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 16/269,870

(22) Filed: Feb. 7, 2019

(65) Prior Publication Data

US 2020/0259859 A1 Aug. 13, 2020

(51) Int. Cl.
*G06F 15/16* (2006.01)
*H04L 9/40* (2022.01)
(Continued)

(52) U.S. Cl.
CPC .......... *H04L 63/1458* (2013.01); *H04L 41/22* (2013.01); *H04L 61/4511* (2022.05); *H04L 61/5007* (2022.05); *H04L 2463/141* (2013.01)

(58) Field of Classification Search
CPC . H04L 63/1458; H04L 41/22; H04L 61/1511; H04L 61/2007; H04L 2463/141;
(Continued)

(56) References Cited

U.S. PATENT DOCUMENTS 8,463,915 B1    6/2013  Kim
8,935,428 B2    1/2015  Anderson et al.
(Continued)

FOREIGN PATENT DOCUMENTS

WO    WO-2007117298 A2 *  10/2007  ........... G06Q 10/109
WO    WO-2008052291 A2 *   5/2008  ....... H04L 29/12009
WO    WO-2009035822 A1 *   3/2009  ......... H04L 63/1458

OTHER PUBLICATIONS

Detecting Distributed Denial of Service Attack Traffic at the Agent Machines Vicky Laurens;Abdulmotaleb El Saddik;Pulak Dhar;Vineet Srivastava 2006 Canadian Conference on Electrical and Computer Engineering (Year: 2006).*

(Continued)

*Primary Examiner* — Oscar A Louie
*Assistant Examiner* — Oluwatosin M Gidado
(74) *Attorney, Agent, or Firm* — Heslin Rothenberg Farley & Mesiti P.C.; Edward Wixted, Esq.

(57) ABSTRACT

A method, computer program product, and a system where a processor(s) determines that a destination has been retained as a link in an application. The processor(s) monitors connections of the application to the destination retained as the link, where connecting is providing a locator of the destination to a server(s) to obtain an address for the destination. The processor(s) determines an average time period measured from providing the locator to the server(s) to obtaining the address. The processor(s) retains the returned address for each connection within a given time period. The processor(s) determines that the application has initiated a new connection to the destination and the new connection is incomplete after a time period calculated relative to the average time period has lapsed. The processor(s) provides selectable options in a user interface of the application that are the retained address(es).

16 Claims, 5 Drawing Sheets

(51) Int. Cl.
  *H04L 41/22* (2022.01)
  *H04L 61/4511* (2022.01)
  *H04L 61/5007* (2022.01)

(58) Field of Classification Search
  CPC ............. H04L 63/1408; H04L 63/1416; H04L 63/1466; H04L 63/1425; H04L 63/1433; H04L 63/0263; H04L 63/20; H04L 63/0281; H04L 63/1441; H04L 47/10
  USPC .......................................................... 726/22
  See application file for complete search history.

(56) References Cited

U.S. PATENT DOCUMENTS

| | | | |
|---|---|---|---|
| 9,294,435 B2 | 3/2016 | Ivanov | |
| 9,436,777 B2 | 9/2016 | Stefanov | |
| 2004/0054924 A1* | 3/2004 | Chuah | H04L 47/10 726/22 |
| 2010/0138921 A1* | 6/2010 | Na | H04L 63/1458 726/22 |
| 2011/0113489 A1* | 5/2011 | Nakhre | H04L 63/1458 726/22 |
| 2013/0097699 A1* | 4/2013 | Balupari | H04L 63/1441 726/22 |
| 2014/0130152 A1* | 5/2014 | Boodaei | H04L 61/1511 726/22 |
| 2014/0373146 A1* | 12/2014 | Murthy | H04L 63/1408 726/23 |
| 2017/0344618 A1* | 11/2017 | Horowitz | G06F 11/2097 |

OTHER PUBLICATIONS

An Efficient Counter-Based DDoS Attack Detection Framework Leveraging Software Defined IoT (SD-IoT) Jalal Bhayo;Sufian Hameed; Syed Attique Shah IEEE Access Year: 2020 | vol. 8 | Journal Article | Publisher: IEEE (Year: 2020).*

Floodshield: Securing the SDN Infrastructure Against Denial-of-Service Attacks Menghao Zhang;Jun Bi;Jiasong Bai;Guanyu Li 2018 17th IEEE International Conference on Trust, Security and Privacy in Computing and Communications/ 12th IEEE International Conference on Big Data Science and Engineering (Year: 2018).*

Mell et al., "The NIST Definition of Cloud Computing", National Institute of Standards and Technology, U.S. Department of Commerce, NIST Special Publication 800-145, Sep. 2011, 7 pages.

* cited by examiner

DENIAL OF SERVICE ATTACK MITIGATION THROUGH DIRECT ADDRESS CONNECTION

BACKGROUND

Denial of Service (DOS) attacks are a serious problem on the Internet. In a DOS attack against a service, large numbers of malicious computers (clients) try to connect to a service (e.g., executed on a web server). Clients overwhelm the service, so that legitimate users experience very poor service or no service at all, and the attack may overwhelm the network in the vicinity of the server. An effective, and growing type of DOS attack, is one against Domain Network Services (DNS) servers. DNS servers comprise lookup tables that translate domains (e.g., Uniform Resource Locators (URLs)) into Internet Protocol (IP) addresses, which is referred to as running DNS. When a DOS attack is launched against one of the main DNS servers, the ability of users to reach websites is significantly impacted.

SUMMARY

Shortcomings of the prior art are overcome and additional advantages are provided through the provision of a method for providing an alternative connection to a destination based on a suspected DOS attack. The method includes, for instance: determining, by one or more processors, that a destination has been retained as a link in an application based on monitoring connections of the application to one or more destinations; monitoring, by the one or more processors, connections of the application to the destination retained as the link, wherein each connection comprises the application providing a locator of the destination to one or more servers to obtain an address for the destination from the one or more servers, based on providing the locator; determining, by the one or more processors, based on monitoring the connections of the application to the destination, an average time period measured from providing the locator of the destination to the one or more servers to obtaining the address from the one or more servers; retaining, by the one or more processors, for each connection of the monitored connections of the application to the destination within a given time period, the address obtained from the one or more servers; based on the monitoring, determining, by the one or more processors, that the application has initiated a new connection to the destination and the new connection is incomplete after a time period calculated relative to the average time period has lapsed; and providing, by the one or more processors, for each connection of the monitored connections of the application to the destination within the given time period, the address obtained from the one or more servers, as selectable options in a user interface of the application.

Shortcomings of the prior art are overcome and additional advantages are provided through the provision of a computer program product for providing an alternative connection to a destination based on a suspected DOS attack. The computer program product comprises a storage medium readable by a processing circuit and storing instructions for execution by the processing circuit for performing a method. The method includes, for instance: determining, the by one or more processors, that a destination has been retained as a link in an application based on monitoring connections of the application to one or more destinations; monitoring, by the one or more processors, connections of the application to the destination retained as the link, wherein each connection comprises the application providing a locator of the destination to one or more servers to obtain an address for the destination from the one or more servers, based on providing the locator; determining, by the one or more processors, based on monitoring the connections of the application to the destination, an average time period measured from providing the locator of the destination to the one or more servers to obtaining the address from the one or more servers; retaining, by the one or more processors, for each connection of the monitored connections of the application to the destination within a given time period, the address obtained from the one or more servers; based on the monitoring, determining, by the one or more processors, that the application has initiated a new connection to the destination and the new connection is incomplete after a time period calculated relative to the average time period has lapsed; and providing, by the one or more processors, for each connection of the monitored connections of the application to the destination within the given time period, the address obtained from the one or more servers, as selectable options in a user interface of the application.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
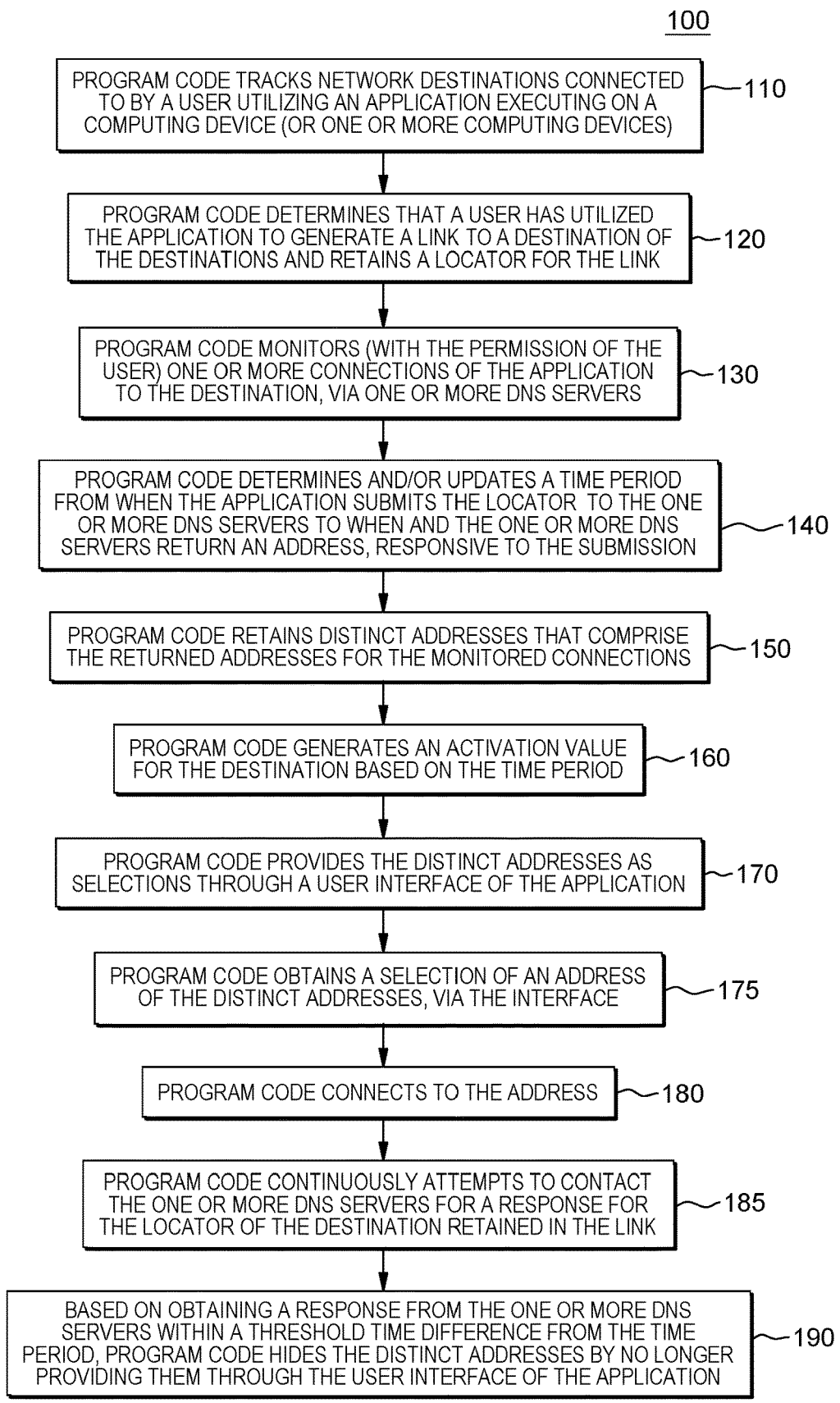
FIG. 1 is a workflow that illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
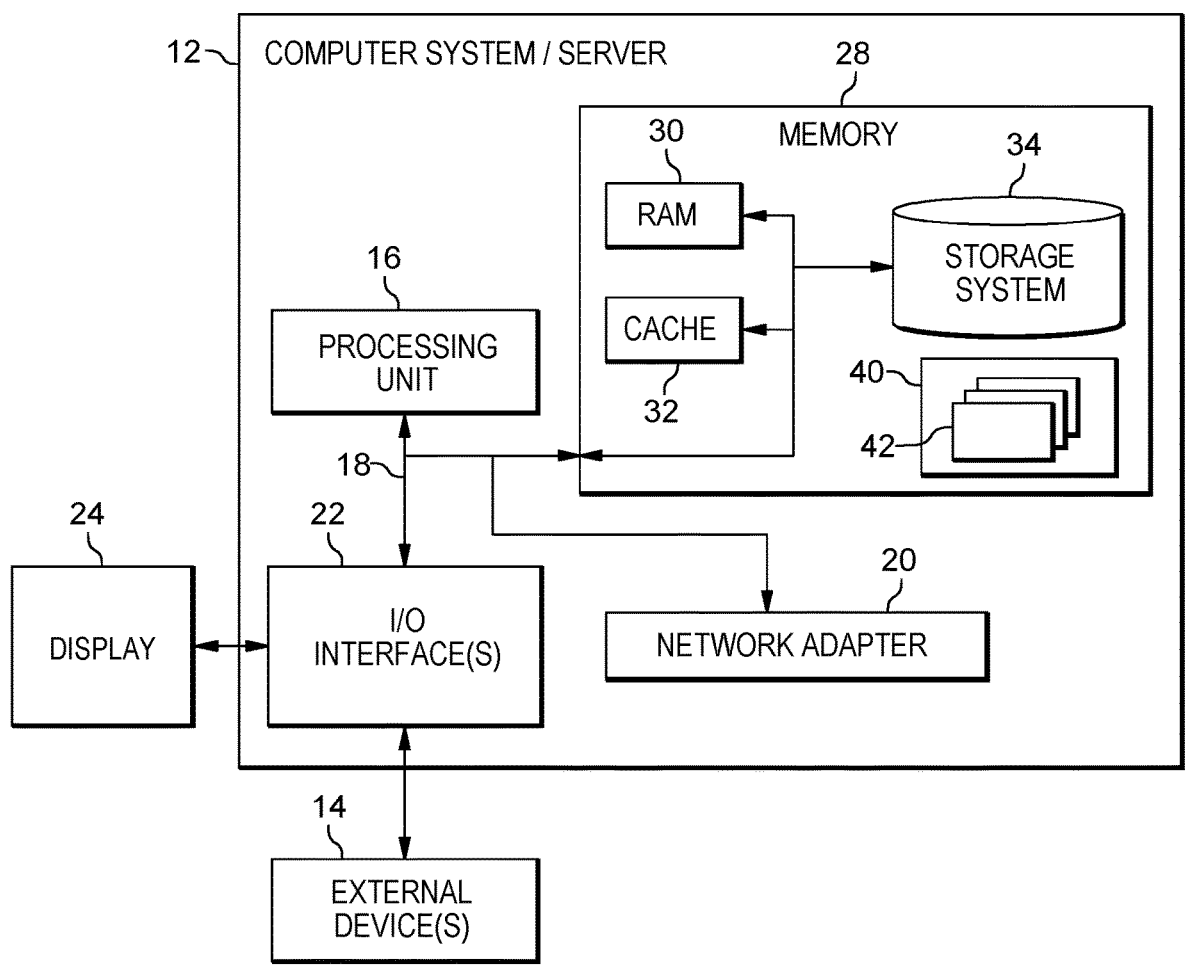
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Embodiments of the present invention include a computer-implemented method, a computer program product, and a computer system that include program code executed on at least one processing circuit that caches one or more addresses (e.g., IP addresses) of destinations (e.g., webpages). When reconnection to the destinations is requested by the program code or a given application, the program code can connect to the destination via one or more of the cached addresses. Utilizing the addresses to connect to the destination bypasses DNS, which may be experiencing a DOS attack. In some embodiments of the present invention, the program code: 1) obtains a command from an application (e.g., a web browser) to retain a link (e.g., bookmark, shortcut) to a given destination (e.g., webpage, website, domain); 2) retains one or more addresses (e.g., IP addresses) and associates the addresses with a locator (e.g., URL) retained in the link; 3) monitors (with the permission of the user) the application initiating a connection, via the link, to the destination; 4) based on the monitoring, determines a predetermined period of time has passed without the connection being realized using the locator; and 5) enables the application to complete the connection through one or more of the addresses instead of the locator. In some embodiments of the present invention, the program code enables connection through one or more addresses after determining that the application has received no response from a DNS server. In some embodiments of the present invention, rather than connecting to the destination automatically when the connection via the locator (via the DNS server) fails (e.g., times out, fails to connect, does not connect within a predetermined period of time), the program code provides a user of the application with an option of selecting an address of the one or more addresses to use to connect to the destination. The program code can provide this list in the graphical user interface of the application and obtain a selection through this interface. In some embodiments of the present invention, the program code retains the one or more addresses associated with the link to the destination in a separate data structure, such as a table, generated by the program code. In some embodiments of the present invention, the program code automatically determines (and regularly updates) the predetermined period of time based on monitoring (with the permission of the user) the average time the application utilizes to acquire an address to when connecting to a destination via a DNS server, which includes: the time from the application connecting to a DNS server, via the locator, and the time to receive an address (e.g., IP address), from the DNS server. In some embodiments of the present invention, the predetermined period of time is specific to resolving a given link to a destination, and the program code stores different periods of time for different destinations.

Embodiments of the present invention are inextricably tied to computing at least because they are directed to addressing an issue that is unique to computing and providing a technical approach that is also within this sphere. Utilizing an application, such as a web browser, to connect to a destination, such as a website, is an activity unique to computing. A challenge to performing this activity are DOS attacks on DNS servers, which affect the ability of the DNS server to translate a locator (e.g., URL) for a destination into an address of that destination (e.g., webpage, website, domain). Embodiments of the present invention provide a technical workaround to this challenge that is unique to computing: forming a connection from a cached address to a destination, directly, without utilizing a DNS server to make the connection (i.e., translate a locator into an address), based on determining that an attempted connection through the usual avenue, the DNS server, is not performing as expected.

Aspects of embodiments of the present invention provide advantages over existing approaches to mitigating the effects of a DOS attack on a DNS Server and maintaining continuity when connecting to a destination, during which one would utilize a DNS Server in the regular course. Existing approaches tend to focus on enabling an alternate approach to connecting to a destination when a DNS server is either unresponsive, meaning it is unreachable, or the DNS server provides an active response that it cannot provide data requested. Embodiments of the present invention provide significantly more than this approach by determining that a possible issue exists with a DNS server even before such a definitive response is received, thus providing business continuity before an issue is perceived by a user. In addition to benefiting the user, anticipating and diagnosing network and server issues at an earlier time is generally beneficial to maintaining the efficiency of processes performed on the network.

FIG. 1 is a workflow 100 that illustrates various aspects of some embodiments of the present invention. In some embodiments of the present invention, program code (after obtaining permission for a user) tracks network destinations connected to by a user utilizing an application executing on a computing device (or one or more computing devices) (110). The destinations can be websites, the application can be a web browser, and/or the network can be the Internet, in various embodiments of the present invention. The program code determines that a user has utilized the application to generate a link to a destination of the destinations and retains a locator for the link (120). The link can be a bookmark and the user can utilize the bookmarking functionality provided by the application to create this bookmark. The bookmark can be a locator (e.g., URL), which is saved as an avenue of access to the destination through translation into an address by a DNS server. In some embodiments of the present invention, the program code can automatically generate a bookmark utilizing the application for a destination that the application has visited a given number of times (e.g., 3, 4, 5, etc.). In some embodiments of the present invention, the application used to visit destination comprises the program code illustrated in FIG. 1. However, for ease of understanding and illustrative purposes only, in this figure, the application and the program code are designated as separate entities, though they can be parts of a common entity.

In some embodiments of the present invention, when a user accesses a destination specified by a link (either through a shortcut and/or through direct entry of a locator such as a URL), via the application, the program code monitors (with the permission of the user) one or more connections of the application to the destination, via one or more DNS servers (130). Based on the monitoring, the program code determines and/or updates a time period from when the application submits the locator (e.g., URL) to the one or more DNS servers to when and the one or more DNS servers return an address (e.g., IP address), responsive to the submission (140). The time period (e.g., the time to resolve a destination name) can be maintained as an average time period for a connection from submission of a locator to the return of an address, via a DNS server. The program code retains distinct addresses that comprise the returned addresses for the monitored connections (150). In some embodiments of the present invention, the program code monitors connections to most commonly visited destinations associated with links, as opposed to all destination associated with links. In some embodiments of the present invention, the program code retains a set number "n" distinct addresses per link, based on the monitoring. In addition to or instead of retaining a set number of distinct addresses, the program code can retain distinct addresses from a defined period of time, for example, the last n days or weeks of browsing activity. In some embodiments of the present invention, the program code can retain only the "n" most recent addresses where "n" is assigned a given value. In some embodiments of the present invention, the program code expires a saved address after a set period of time has lapsed.

Figure 2:
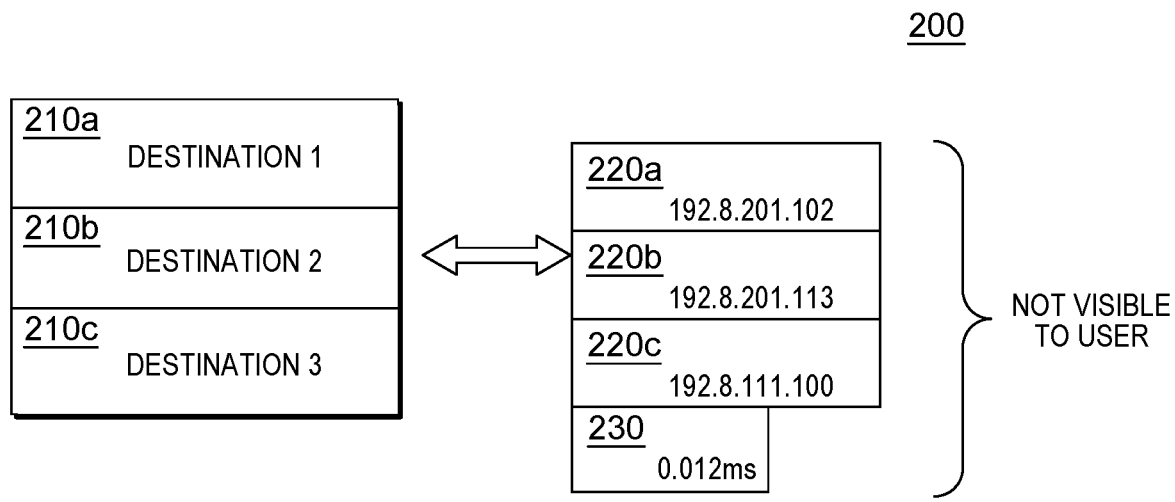
FIG. 2 illustrates various aspects of some embodiments of the present invention.

FIG. 2 is an example of data 200 retained and maintained by program code in embodiments of the present invention. As discussed in FIG. 1, the program code determines that a user has utilized the application to generate links to destinations (e.g., FIG. 1, 120) (e.g., webpages, websites, domains) and FIG. 2 illustrates three links to destinations 210a-210c created by the program code and/or the application. The program code then monitors connection to these destinations 210a-210c, through the locators for the destinations and retains both a calculated average time for connecting to each destination through DNS (e.g., FIG. 1, 140) and distinct addresses that comprise the returned addresses for the monitored connections to the destinations (e.g., FIG. 1, 150). The distinct addresses 220a-220c returned by the program code based on connections to one destination 210b are illustrated in FIG. 2. Also illustrated in FIG. 2 is the average time 230 calculated and updated by the program code for connection to the destination 210b via DNS. As noted in FIG. 2, in some embodiments of the present invention, although the link list 210a-210c is visible to a user of the application, through a graphical user interface, the distinct addresses 220a-220c and the average time 230 are not visible. This data is retained in a data structure behind the scenes by the program code.

Returning to FIG. 1, the program code generates an activation value for the destination based on the time period (160). The activation value represents a time at which the slowness of a connection to a destination via a DNS server could indicate an issue with the DNS server. For example, in some embodiments of the present invention, the program code generates an activation value that is "x" times the time period, where x represents a number (e.g., 50, 100). In some embodiments of the present invention, a user configures x via an interface (e.g., of the application). In some embodiments of the present invention, the program code determines the activation value based on tracking the timing associated with failed connections to DNS via the application, determining an average, and deducting a standard deviation (or larger value) from the average.

Based on having established an activation value for the destination and the monitoring, the program code determines that timing associated with a connection to the destination exceeds the activation value (165). The program code provides the distinct addresses as selections through a user interface of the application (170). The program code obtains a selection of an address of the distinct addresses, via the interface (175). Based on obtaining the selection, the program code connects to the address (180). The program code provides this alternative method of connection to the user of the application because the lapse of the indication value indicates a potential DOS attack on a DNS server is in progress. In some embodiments of the present invention, in addition to providing the addresses in the interface, the program code provides an alert to the user and/or transmits an alert to an administrator. By selecting an address, the application can connect to the destination and bypassing the one or more DNS servers.

In some embodiments of the present invention, contemporaneously with the application connecting to the destination via the address, the program code (e.g., a daemon) continuously attempts to contact the one or more DNS servers for a response for the locator of the destination retained in the link (185). For example, the program code can ping DNS. Based on obtaining a response from the one or more DNS servers within a threshold time period from the time period, the program code hides the distinct addresses by no longer providing them through the user interface of the application (190). In some embodiments of the present invention, the response time is twenty percent (20%).

Figure 3:
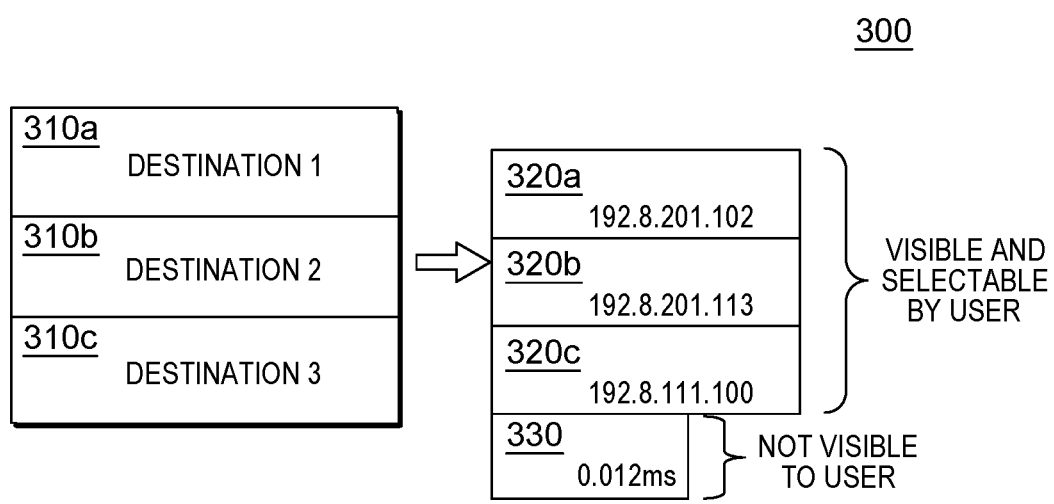
FIG. 3 illustrates various aspects of some embodiments of the present invention.

FIG. 3 is an illustration of the data 300 retained and maintained by program code in embodiments of the present invention, that illustrates that the visibility of various data, to a user, is changed by the program code, based on program code determining that timing associated with a connection to the destination exceeds the activation value (e.g., FIG. 1, 165). As illustrated in FIG. 3, the program code retains links to destinations 310a-310c, and for each destination, though only one is illustrated, for ease of understanding, the program code determines and retains distinct addresses 320a-320c, and an average time 330.

Embodiments of the present invention include a computer-implemented method, a computer program product, and a computer system, where program code executing on one or more processors determines that a destination has been retained as a link in an application based on monitoring connections of the application to one or more destinations. The program code monitors connections of the application to the destination retained as the link, where each connection comprises the application providing a locator of the destination to one or more servers to obtain an address for the destination from the one or more servers, based on providing the locator. The program code determines, based on monitoring the connections of the application to the destination, an average time period measured from providing the locator of the destination to the one or more servers to obtaining the address from the one or more servers. The program code retains, for each connection of the monitored connections of the application to the destination within a given time period, the address obtained from the one or more servers. Based on the monitoring, the program code determines that the application has initiated a new connection to the destination and the new connection is incomplete after a time period calculated relative to the average time period has lapsed. The program code provides, for each connection of the monitored connections of the application to the destination within the given time period, the address obtained from the one or more servers, as selectable options in a user interface of the application.

In some embodiments of the present invention, the program code obtains a selection of a selectable option of the selectable options in the user interface of the application. The program code completes the new connection, via the application, to the destination, based on utilizing an address associated with the selection, where completing the connection comprises bypassing the one or more servers.

In some embodiments of the present invention, the program code continuously submits, via the application, the locator to the one or more servers to obtain an address of the destination. The program code determines that a submission during the continuously transmitting resulted in obtaining the address of the destination from the one or more servers within a threshold time difference from the average time.

In some embodiments of the present invention, the program code hides the provided selectable options in the user interface of the application. Thus, the selectable options are no longer available to the user, through the interface.

In some embodiments of the present invention, the selectable options comprise unique addresses obtained within the given time period.

In some embodiments of the present invention, the selectable options comprise a pre-determined number of most recently obtained unique addresses obtained within the given time period.

In some embodiments of the present invention, the one or more servers execute domain network services to provide the address responsive to obtaining the locator.

In some embodiments of the present invention, the link comprises a bookmark.

In some embodiments of the present invention, the locator comprises a uniform resource locators.

In some embodiments of the present invention, each selectable comprises an Internet Protocol address.

In some embodiments of the present invention, the program code calculates the time period calculated relative to the average time period has lapsed, where the calculating comprises multiplying the average time by a multiplier.

In some embodiments of the present invention, the multiplier is 100.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, each of the one or more DNS servers (discussed in FIGS. 1-3) and/or the one or more processors executing the program code (discussed in FIGS. 1-3) can each be understood as a cloud computing node 10 (FIG. 4) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired aFlpplications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
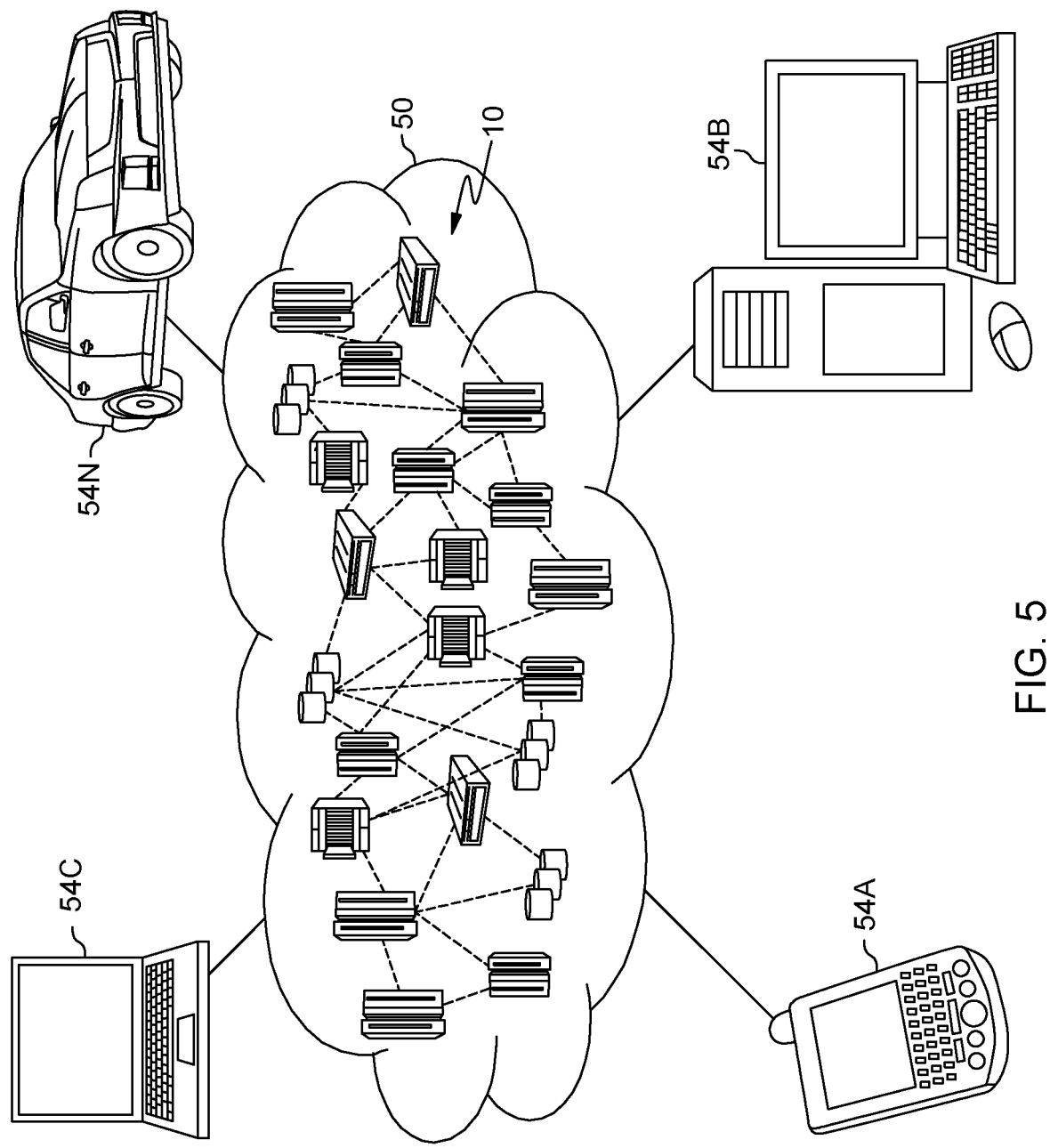
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
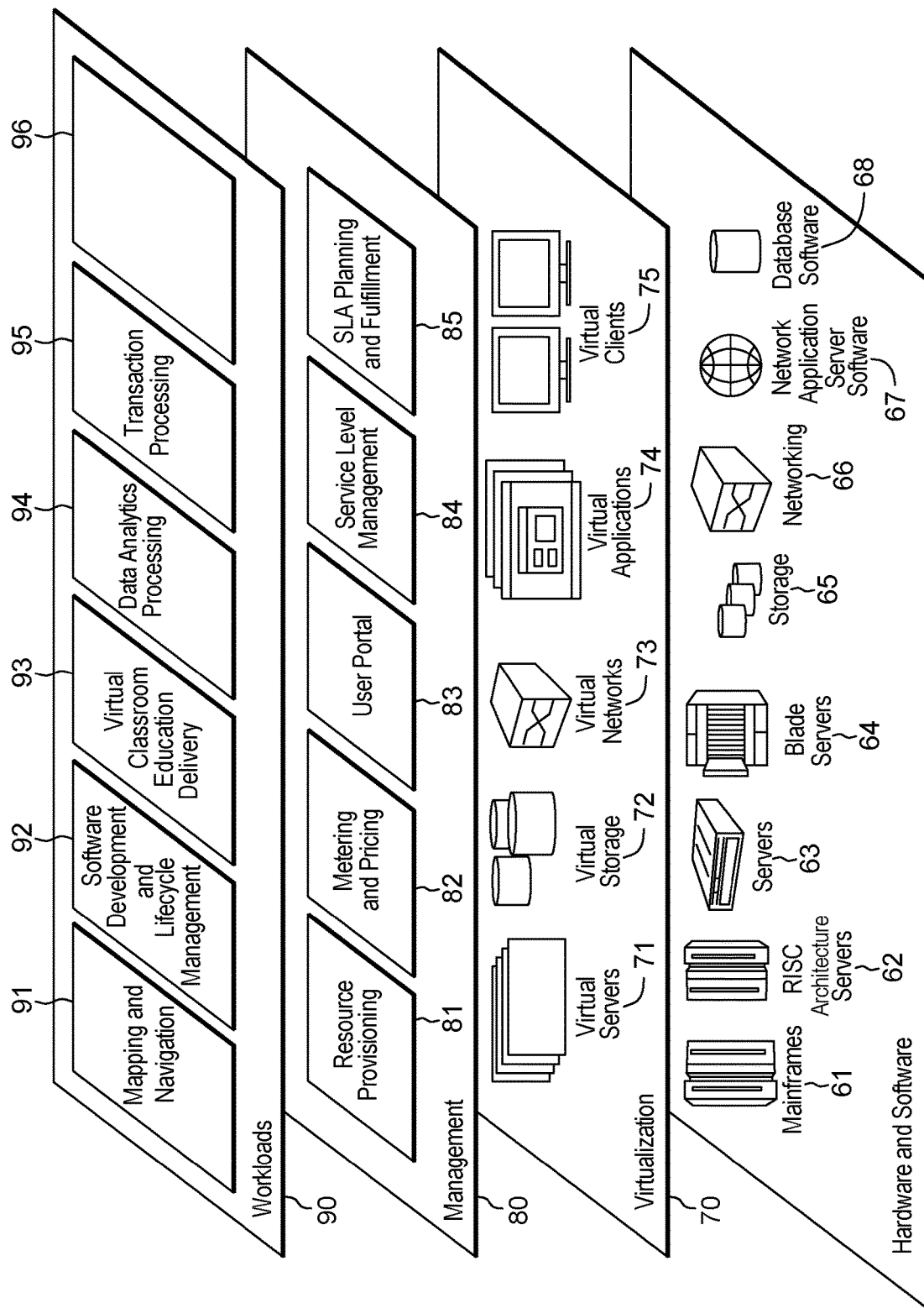
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and maintaining connection continuity during a suspected DOS attack 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising: determining, by one or more processors, that a destination has been retained as a link in an application based on monitoring connections of the application to one or more destinations; monitoring, by the one or more processors, connections of the application to the destination retained as the link, wherein each connection comprises the application providing a locator of the destination to one or more servers to obtain an address for the destination from the one or more servers, based on providing the locator, wherein the one or more servers execute domain network services to provide the address responsive to obtaining the locator; determining, by the one or more processors, based on monitoring the connections of the application to the destination, an average time period measured from providing the locator of the destination to the one or more servers to obtaining the address from the one or more servers; retaining, by the one or more processors, for each connection of the monitored connections of the application to the destination within a given time period, the address obtained from the one or more servers, wherein based on retaining the address for each connection, the one or more processors retain a group of addresses, wherein each of the addresses of the group of addresses is utilized to connect via the application directly to the destination, wherein connecting directly to the destination comprises completing a connection to the destination bypassing the one or more servers and the domain network services executed by the one or more servers; based on the monitoring, determining, by the one or more processors, that the application has initiated a new connection to the destination and the new connection is incomplete after a time period calculated relative to the average time period has lapsed; based on the determining, providing, by the one or more processors, the group of addresses, as selectable options in a user interface of the application; obtaining, by the one or more processors, a selection of a selectable option of the selectable options in the user interface of the application; and completing, by the one or more processors, the new connection, via the application, to the destination, based on utilizing an address of the group of addresses associated with the selection, wherein completing the connection comprises bypassing the one or more servers and the domain network services executed by the one or more servers.

2. The computer-implemented method of claim 1, further comprising: continuously submitting, by the one or more processors, via the application, the locator to the one or more servers to obtain an address of the destination; and determining, by the one or more processors, that a submission during the continuously transmitting resulted in obtaining the address of the destination from the one or more servers within a threshold time difference from the average time.

3. The computer-implemented method of claim 2, further comprising: hiding, by the one or more processors, the provided selectable options in the user interface of the application.

4. The computer-implemented method of claim 1, wherein the selectable options comprise unique addresses obtained within the given time period.

5. The computer-implemented method of claim 1, wherein the selectable options comprise a pre-determined number of most recently obtained unique addresses obtained within the given time period.

6. The computer-implemented method of claim 1, wherein the link comprises a bookmark.

7. The computer implemented method of claim 1, wherein the locator comprises a uniform resource locator.

8. The computer-implemented method of claim 1, wherein each selectable comprises an Internet Protocol address.

9. The computer implemented method of claim 1, further comprising: calculating, by the one or more processors, the time period calculated relative to the average time period has lapsed, wherein the calculating comprises multiplying the average time by a multiplier.

10. The computer-implemented method of claim 1, wherein the multiplier is 100.

11. A computer program product comprising: a computer readable storage medium readable by one or more processors and storing instructions for execution by the one or more processors for performing a method comprising: determining, by the one or more processors, that a destination has been retained as a link in an application based on monitoring connections of the application to one or more destinations; monitoring, by the one or more processors, connections of the application to the destination retained as the link, wherein each connection comprises the application providing a locator of the destination to one or more servers to obtain an address for the destination from the one or more servers, based on providing the locator; determining, by the one or more processors, based on monitoring the connections of the application to the destination, an average time period measured from providing the locator of the destination to the one or more servers to obtaining the address from the one or more servers; retaining, by the one or more processors, for each connection of the monitored connections of the application to the destination within a given time period, the address obtained from the one or more servers, wherein based on retaining the address for each connection, the one or more processors retain a group of addresses, wherein each of the addresses of the group of addresses is utilized to connect via the application directly to the destination, wherein connecting directly to the destination comprises completing a connection to the destination bypassing the one or more servers and the domain network services executed by the one or more servers; based on the monitoring, determining, by the one or more processors, that the application has initiated a new connection to the destination and the new connection is incomplete after a time period calculated relative to the average time period has lapsed; based on the determining, providing, by the one or more processors, the group of addresses, as selectable options in a user interface of the application; obtaining, by the one or more processors, a selection of a selectable option of the selectable options in the user interface of the application; and completing, by the one or more processors, the new connection, via the application, to the destination, based on utilizing an address of the group of addresses associated with the selection, wherein completing the connection comprises bypassing the one or more servers and the domain network services executed by the one or more servers.

12. The computer program product of claim 11, the method further comprising: continuously submitting, by the one or more processors, via the application, the locator to the one or more servers to obtain an address of the destination; and determining, by the one or more processors, that a submission during the continuously transmitting resulted in obtaining the address of the destination from the one or more servers within a threshold time difference from the average time.

13. The computer program product of claim 12, the method further comprising: hiding, by the one or more processors, the provided selectable options in the user interface of the application.

14. The computer program product of claim 11, wherein the selectable options comprise unique addresses obtained within the given time period.

15. A system comprising: a memory; one or more processors in communication with the memory; program instructions executable by the one or more processors via the memory to perform a method, the method comprising: determining, by the one or more processors, that a destination has been retained as a link in an application based on monitoring connections of the application to one or more destinations; monitoring, by the one or more processors, connections of the application to the destination retained as the link, wherein each connection comprises the application providing a locator of the destination to one or more servers to obtain an address for the destination from the one or more servers, based on providing the locator; determining, by the one or more processors, based on monitoring the connections of the application to the destination, an average time period measured from providing the locator of the destination to the one or more servers to obtaining the address from the one or more servers; retaining, by the one or more processors, for each connection of the monitored connections of the application to the destination within a given time period, the address obtained from the one or more servers, wherein based on retaining the address for each connection, the one or more processors retain a group of addresses, wherein each of the addresses of the group of addresses is utilized to connect via the application directly to the destination, wherein connecting directly to the destination comprises completing a connection to the destination bypassing the one or more servers and the domain network services executed by the one or more servers; based on the monitoring, determining, by the one or more processors, that the application has initiated a new connection to the destination and the new connection is incomplete after a time period calculated relative to the average time period has lapsed; based on the determining, providing, by the one or more processors, the group of addresses as selectable options in a user interface of the application; obtaining, by the one or more processors, a selection of a selectable option of the selectable options in the user interface of the application; and completing, by the one or more processors, the new connection, via the application, to the destination, based on utilizing an address of the group of addresses associated with the selection, wherein completing the connection comprises bypassing the one or more servers and the domain network services executed by the one or more servers.

16. The system of claim 15, the method further comprising: continuously submitting, by the one or more processors, via the application, the locator to the one or more servers to obtain an address of the destination; and determining, by the one or more processors, that a submission during the continuously transmitting resulted in obtaining the address of the destination from the one or more servers within a threshold time difference from the average time.

* * * * *